United States Patent [19]
Abbes et al.

[11] 3,820,799
[45] June 28, 1974

[54] RESILIENT METAL GASKET

[75] Inventors: Claud Abbes, St-Etienne; Santos Bianchi, Bourg-St-Andeol; Roger Chevallereau, Bollene; Maurice Moreau, LaPalud; Jean Rogemont, St-Etienne; Robert Roques, Pont-St-Esprit; Christian Rouaud, Pierrelatte; Henri Royer, Orange, all of France

[73] Assignee: Commissariat al'Energie Atomique, Paris, France

[22] Filed: Aug. 16, 1972

[21] Appl. No.: 280,952

[52] U.S. Cl. ............................. 277/164, 277/236
[51] Int. Cl. ......... F16j 15/00, F16j 9/06, F02f 5/00
[58] Field of Search ........ 277/164, 205, 235, 235 B, 277/153

[56] References Cited
UNITED STATES PATENTS
| | | | |
|---|---|---|---|
| 1,475,680 | 11/1923 | Borkey | 277/164 |
| 2,948,527 | 8/1960 | Gilbert | 277/164 |
| 3,575,428 | 4/1971 | Fuhrmann | 277/235 B |

FOREIGN PATENTS OR APPLICATIONS
| | | | |
|---|---|---|---|
| 225,626 | 2/1968 | Sweden | 277/235 B |

*Primary Examiner*—Samuel B. Rothberg
*Assistant Examiner*—Robert L. Smith
*Attorney, Agent, or Firm*—Cameron, Kerkam, Sutton, Stowell & Stowell

[57] ABSTRACT

The invention relates to a resilient metal gasket which has outstanding crushing and residual resilience properties. The gasket comprises a central core formed by a metal wire helical spring which is closed on itself and is toroidal in shape in the inoperative state. The spring is enclosed by a first resilient hard metal envelope which in turn is enclosed by a second independent envelope of a ductile metal. The two envelopes enclosing the spring both have the form of a toroidal surface whose generating circle includes a gap. The helical spring has continuous turns and its ends may be joined together by a short connecting element such as a second spring.

7 Claims, 6 Drawing Figures

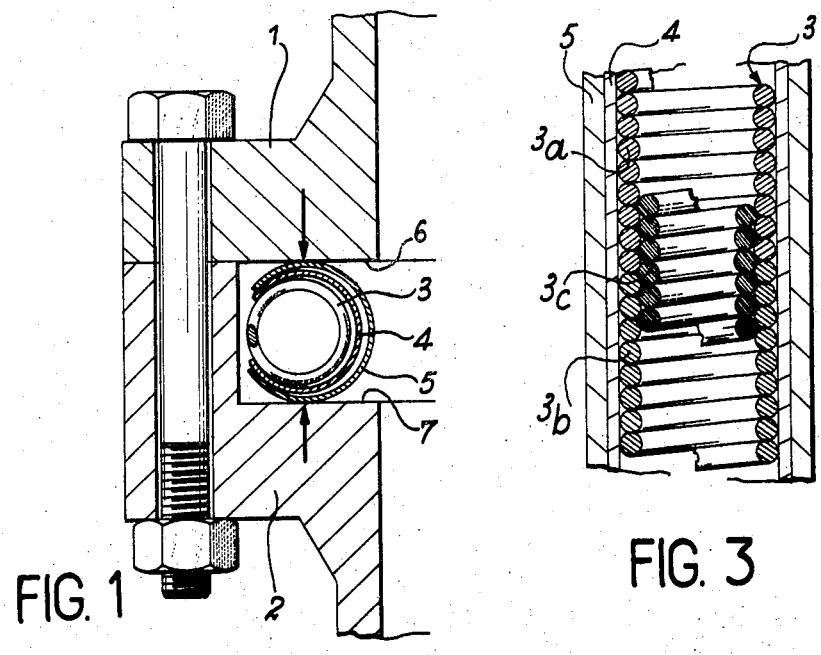
FIG. 1
FIG. 3
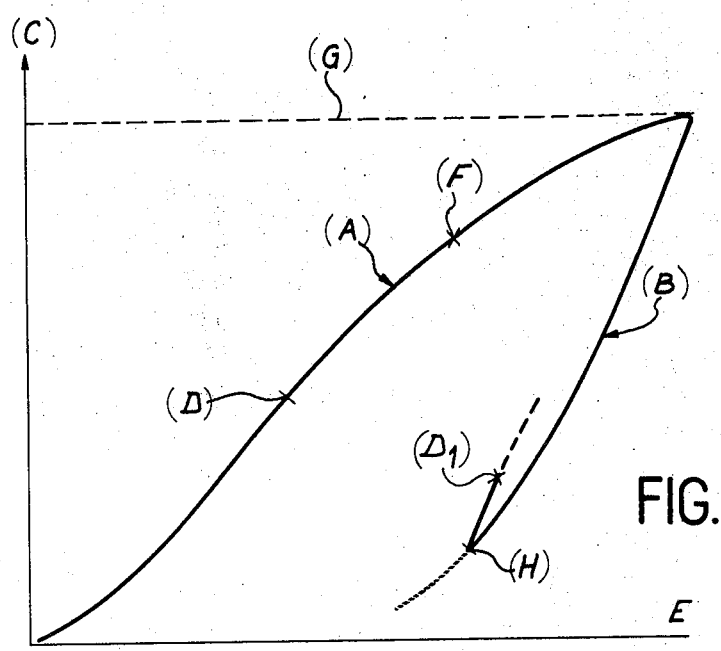
FIG. 2

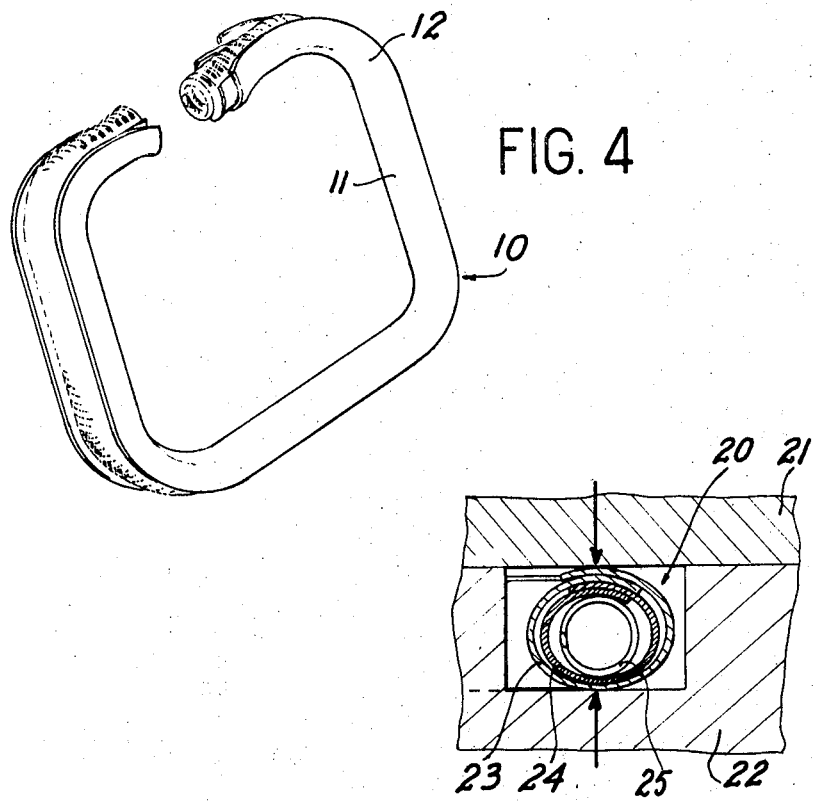

RESILIENT METAL GASKET

The invention relates to a resilient metal gasket having outstanding crushing and residual resilience properties, thereby adding the advantages of elastomeric gaskets to those of the conventional metal gaskets, and more particularly enabling such gaskets to be satisfactorily mounted in flange grooves with a given tightness and metal-to-metal contact.

Metal gaskets are known which comprise a central core formed by a helical spring and disposed inside an envelope at least partially enclosing the spring and made of a hard resilient material, for instance, steel of a suitable grade. It is also known in a gasket of the kind specified to coat the outer face, and if necessary the inner face of the envelope, with one or more layers of a soft material allowing more ready adaptation to unevennesses in the surfaces to be sealed, for example due to the outer layer. Advantageously in this known embodiment the inert spring can be so plastically or resiliently pre-deformed that it exerts a substantially constant sealing pressure on the envelope in use under the tightening pressures applied to it.

Although the aforedescribed methods may be satisfactory in certain particular conditions of use, for example for relatively small gasket diameters on which only modest sealing demands are made, such as, for instance, in making motor-car cylinder head gaskets, it is not true in other fields, such as vacuum or ultravacuum, particle accelerators, nuclear reactors, aeronautic applications, applied electronics, etc., in which the metal gaskets, faced with problems of temperature, corrosion and mechanical behaviour in time, must reach very high degrees of sealing tightness, for example with leakage rates less than or equal to $10^{-5}$ lusec, with considerable gasket diameters of the order of several metres and mounting with flange-to-flange tightening limiting the deforming of gaskets, sealing tightness having to be maintained in this instance for a number of years in continuous service.

The invention therefore relates to a metal joint which meets the demands satisfactorily.

To this end the invention provides a resilient metal gasket comprising a central core formed by a metal wire helical spring with continuous turns and high axial compressive stressing which is closed on itself and is toroidal in shape in the inoperative state; and a first resilient hard metal envelope which encloses the spring and has in the inoperative state the shape of a toroidal surface whose generating circle comprises a gap, characterised in that the gasket comprises a second independent envelope of ductile metal which enclose the first envelope and also has in the inoperative state the form of a toroidal surface whose generating circle comprises a gap.

Advantageously, the ends of the helical spring of the central core are joined to one another by a short connecting element formed by a second spring whose outside diameter is substantially equal to the inside diameter of the spring of the central core, such element being formed by a metal wire which is identical with the wire of the spring of the core and which is screwed into both ends of such spring to connect them together. As a variant, the ends of the helical spring are joined by a weld which connects the final turns of the spring.

Other features of the metal gasket according to the invention will be gathered from the following description of a number of embodiments and applications of the gasket, which also brings out the specific advantages obtained, the description referring to the accompanying non-limitative exemplary drawings, wherein:

FIG. 1 is a cross-section through a metal gasket according to the invention, mounted between two tightening flanges, FIG. 2 illustrates the crushing curve of the gasket in dependence on the loading to which it is subjected;

FIG. 3 is a partial view of the gasket, axially sectioned at the level where its ends are joined;

FIG. 4 is a perspective view of a variant embodiment of the gasket, and

FIGS. 5 and 6 illustrate two other applications of the same gasket.

Referring to FIG. 2, the diametric crushing of the gasket are plotted on the abscissa axis (E) and the loadings exerted on the gasket on the ordinate axis (C). The portion (A) of the curve corresponds to loading and the portion (B) to unloading, the reference (D) standing for the sealing threshold in the increasing portion of curve and (H) the leakage threshold in the decreasing portion. The chain line (G) parallel with the abscissa axis corresponds to maximum loading. Lastly, the point (F) corresponds to the point of operation of the gasket in normal service for a given tightening, depending on its conditions of use.

Referring to FIG. 1, the metal gasket according to the invention is shown placed horizontally in a groove made between two flanges 1, 2 although of course it could occupy any other position in space. FIG. 1 shows the joint in cross-section. It comprises a central core formed by a metal helical spring 3, for example made of steel. The spring is constructed to have a very high axial compressive stressing which vigorously applies its turns against one another to prevent them from being tilted laterally and overlaying one another, within immediate breakdown of the sealing tightness between the flanges 1, 2, as a result of the transverse loadings to which the spring is subjected during the use of the gasket. FIG. 3 is closed on itself, its ends 3a, 3b being interconnected, as shown by the partial longitudinal section (FIG. 3), via a short element 3c formed by the second spring whose outside diameter corresponds substantially to the inside diameter of the spring 3, the second spring 3c being formed by a metal wire of the same nature and diameter as the spring 3. The spring 3c can therefore be screwed inside the spring 3 by connecting the ends 3a, 3b in abutment, the spring 3 then forming a torus closed on itself. Of course, other variant embodiments might be used to connect the ends 3a, 3b of the spring 3c, for instance, suitable welding of the end turns.

The spring 3 thus closed is disposed inside a first envelope 4 made of resilient non-ductile metal such as soft steel or rust-resistant steel, the envelope having preferably, but not necessarily, a thickness of the order of 0.3 mm or 0.6 mm. Lastly, according to the invention the envelope 4 is disposed inside a second envelope 5 made of a ductile metal, such as, for instance, aluminium, copper, nickel, titanium . . . , the second envelope having a thickness of about 0.4 to 0.5 mm.

The spring 3 and the envelope 4, 5 have in the inoperative state the general shape of a toroidal surface, the generating circle of each of the two envelopes 4, 5 being so interrupted that the surface of the envelopes has a gap. In other words, if the spring 3 is covered by the two envelopes over its whole length, it is not completely enclosed therein, this feature giving the gasket characteristic properties to be described hereinafter.

The ratio between the nominal diameter of the spring 3 and the diameter for the wire for its turns must meet a number of essential requirements: firstly, the spring must be able to exert a pressure on the envelope 4, 5 such that the point of operation on the curve in FIG. 2 lies at (F), for instance — i.e., beyond the fixed sealing threshold (D) on the curve, corresponding inter alia to a value of $10^{-5}$ lusec for helium. Moreover, the spring must give the gasket adequate residual elasticity adapted to compensate for differential expansions of the assembly members, for example flanges 1, 2 outside forces exerted on such members during operation tending to dissociate them from one another and to limit the co-operation of the facing surfaces of the flanges with the ductile outer envelope 5 of the gasket. Lastly, the spring must limit to a reasonable value the tightening forces of the flanges required to obtain the operating point (F) — i.e., the spring must not be too rigid or the envelopes 4, 5 too thick. Advantageously, the ratio of the diameters of the spring 3 must be 6 to 11 for a currently available steel, this implying a modulus of elasticity having a fairly steep slope, corresponding to about 30 to 40 percent for an insertion of 1 mm adjacent the operating point.

The first envelope 4, of non-ductile resilient metal, distributes uniformly over the second outer ductile metal envelope 5 the loadings exerted in the directions indicated by the arrows in FIG. 1 by the diametrical crushing of the turns of the spring 3. Moreover, the first envelope 4 is so designed as to set up between the spring 3 and the ductile envelope 5 a certain transferring function of such forces, more particularly preventing the turns of the spring from being encrusted or even denting the envelope 5, which would result in the appearance, in the envelope and on its outer surface in contact with the surfaces of the flanges 1, 2 of radial streaks making it impossible to obtain the high sealing tightness required. The use of two successive envelopes 4, 5 therefore acquires full importance in this case and differs considerably from the prior art methods which use only a single envelope, if necessary coated externally with a layer of a soft material, since such methods do not enable the degrees of sealing tightness to be attained which is achieved by the efforts according to the invention for tightening forces necessarily limited by mounting between abutting flanges with a recess of predetermined dimensions therebetween, resulting in definite, invariable crushing of the gasket.

Since the second envelope 5 is made of a ductile metal, it fits satisfactorily against surfaces 6, 7 of the flanges 1, 2 against which the gasket is applied, even if surfaces are only mediocre on the microgeometrical scale, the thickness of the second envelope 5 being such as to enable it to deform plastically enough to absorb and stop up the faults in the surfaces to be sealed.

As a result of these arrangements, the metal gasket according to the invention has crushing and resilient deformation properties which make its behaviour resemble that of gaskets made of elastomeric materials. For example, the position of the point of operation (F) on an increasing portion of the curve and not in the zone of constant characteristic, as in the prior art methods, enables correct operation of the gasket to be obtained with transverse tightening between two flat surfaces without any contact between the gasket and more particularly its outer envelope 5 and the lateral flanks of the groove between the flanges 1, 2 or other abutment members (not shown) liable to be mounted between such flanges perpendicularly to the direction of the tightening force (arrows in FIG. 1). Moreover, the progressive, but limited flattening of the gasket crushing curve (FIG. 2) in the zone of use enables the tolerances in the forces exerted to be increased, and this is favourable to mounting between flanges, although it must be understood that the ratio between the diameters of the springs spoken of hereinbefore, means that the point (F) must be selected in a relatively rigid portion of the curve, corresponding to a spring strong enough for the transmission of the forces to the envelopes enclosing it to be compatible with the required sealing conditions. Lastly, the resilient return of the gasket, as presented by the portion (B) of the curve in FIG. 2, which does not correspond to the portion (A), allows compensation in satisfactory conditions of variations in tightening of the flanges 1, 2, for instance, as a result of variations in pressure or temperature, and permits differentiation of the resilient return of the irreversible remanent deformation.

After the gasket has been tightened and then loosened so as to describe the curve in FIG. 2, from the point (D) to the point (H), if further tightening is performed a fresh sealing threshold is produced at (D1), whose ordinate is intermediate between those of (D) and that of (H). The thresholds (D) and (D1) thus reflect a hysteresis phenomenon in the gasket, due to a remanant deformation, the threshold (D) cumulating the value of the interface pressure required for producing sealing tightness with the initial plastic deformation of the ductile outer envelope 5, ensuring the adaptation of such envelope to the condition of the surfaces of the facing flanges.

Clearly, of course, the metal gasket according to the invention combines with the specific advantages set forth hereinbefore all the advantages of the conventional gasket of the kind specified, inter alia as regards temperature behaviour, even in sudden rapid cycles, resistance to corrosion, rigidity even for large diameters, facility of assembly, the independence of the two envelopes enclosing the central spring also meaning that only the outer ductile element need be replaced after use and the resilient envelope and the spring can be recovered.

The metal gasket according to the invention can also be conveniently manufactured from springs and strips of metal of commercially available industrial quality. For instance, each of the two envelopes 4, 5 can be formed by a simple strip of metal closed on itself by welding and shaped on a burnishing lathe or by any other economic technique. This method of manufacture enables gaskets of all dimensions to be produced, both as regards diameter of the generating circle (1.5 mm to 20 mm or more) and diameter (up to 5 m or more).

As results from the preceding, therefore, the present invention is clearly not limited to the embodiment described hereinbefore. More particularly, if the gasket is to be subjected to elevated pressure and temperatures, the outer envelope 5 can be made of a ductile metal which does not have excessively high flow sensitivity, and the spring can be made of any other material adapted to these special conditions of use.

FIG. 4 illustrates a variant embodiment in which the gasket 10 no longer has a generally circular shape, but a more complicated outline, and is formed of rectilinear portions 11 interconnected by curvilinear portions 12. In this variant all other features of the gasket are identical with those disclosed in relation to the embodiment illustrated in FIG. 1.

Lastly, FIGS. 5 and 6 illustrate two other variants of assembly of the gasket according to the invention. In the first variant (FIG. 5) the gasket 13 identical with that illustrated in FIG. 1 is subjected to radial tightening obtained by the conical fitting on of a member 14 comprising two coaxial portions 15, 16 connected by a conical portion 17, the displacement of the member 14 in the direction of its axis ensuring the tightening of the gasket 13 against the portion 18 of the supporting flange 19. This assembly guarantees sealing tightness, even if the portion 15 of the member 14 should make a movement in relation to the gasket. In the second variant (FIG. 6), the gasket 20 trapped between two tightening members 21, 22 has its envelopes 23, 24 partially closed on themselves, this feature enabling the spring 25 to be protected from the surroundings.

We claim:

1. A resilient metal gasket comprising a central core formed by a metal wire helical spring with continuous turns and high axial compressive stressing which is closed on itself and is toroidal in shape in the inoperative state; a first resilient hard metal envelope substantially covering the outer surface of the spring and having in the inoperative state the shape of a toroidal surface whose generating circle includes a gap, and a second independent envelope of ductile metal substantially covering the outer surface of the first envelope and having in the inoperative state the form of a toroidal surface whose generating circle includes a gap substantially coextensive with the first gap, said spring and said first and second envelopes disengaging when under load except in the areas of application of compression stressing.

2. A metal gasket as set forth in claim 1, having a closed circular outline.

3. A metal gasket as set forth in claim 1, having an outline of a rectilinear portion interconnected by curvilinear portions.

4. A metal gasket as set forth in claim 1, said second envelope being a ductile metal chosen from: the group consisting of aluminium, copper, nickel, and titanium.

5. A metal gasket as set forth in claim 1, said second envelope having a thickness of 0.4 to 0.5 mm, the first envelope having a thickness of 0.3 to 0.6 mm, and the ratio between the nominal diameter of the spring and the diameter of its metal wire being 6 to 11.

6. A metal gasket as set forth in claim 1, characterised in that the second envelope is of open C section when sectioned through a plane containing the axis of the torus formed by the central spring.

7. A metal gasket as set forth in claim 1, said second envelope having a section closed on itself whose ends partly overlap one another when under load, when sectioned through a plane containing the axis of the torus formed by the central spring.

* * * * *

CERTIFICATE OF CORRECTION

Patent No. 3,820,799      Dated June 28, 1974

Inventor(s) (1) Claude ABBES   (2) Santes BIANCHI   (3) Roger CHEV-ALLEREAU (4) Maurice MOREAU (5) Jean ROGEMONT (6) Robert ROQUES (7) Christian ROUAUD It is certified that error appears in the above-identified patent and that said Letters Patent are hereby corrected as shown below:

Foreign Application Priority Data

August 24, 1971    France . . . . . . . . . . 7130649

Signed and sealed this 29th day of October 1974.

(SEAL)
Attest:

McCOY M. GIBSON JR.
Attesting Officer

C. MARSHALL DANN
Commissioner of Patents